United States Patent [19]

Nukada et al.

[11] Patent Number: 5,360,475
[45] Date of Patent: Nov. 1, 1994

[54] PROCESS FOR PREPARING HYDROXYMETAL PHTHALOCYANINE PIGMENT

[75] Inventors: Katsumi Nukada; Katsumi Daimon; Yasuo Sakaguchi, all of Minami Ashigara, Japan

[73] Assignee: Fuji Xerox Co., Ltd., Tokyo, Japan

[21] Appl. No.: 131,747

[22] Filed: Oct. 5, 1993

[30] Foreign Application Priority Data

Oct. 9, 1992 [JP] Japan ................. 4-296564

[51] Int. Cl.$^5$ ............................. C09B 67/50
[52] U.S. Cl. .................... 106/410; 106/413; 540/128; 540/139; 540/140; 540/141
[58] Field of Search ............ 106/410, 413; 540/128, 540/139, 140, 141

[56] References Cited

U.S. PATENT DOCUMENTS

| | | | |
|---|---|---|---|
| 2,770,629 | 11/1956 | Eastes | 540/141 |
| 3,160,635 | 12/1964 | Knudsen et al. | 540/141 |
| 3,357,989 | 12/1967 | Byrne et al. | 540/122 |
| 3,708,292 | 1/1973 | Brach et al. | 430/78 |

FOREIGN PATENT DOCUMENTS

| | | |
|---|---|---|
| 50-38543 | 4/1975 | Japan . |
| 59-133551 | 7/1984 | Japan . |
| 59-155851 | 9/1984 | Japan . |
| 59-168461 | 9/1984 | Japan . |
| 59-180566 | 10/1984 | Japan . |
| 60-59354 | 4/1985 | Japan . |
| 1-221459 | 9/1989 | Japan . |
| 3-30854 | 5/1991 | Japan . |

OTHER PUBLICATIONS

Colaitis; *Bull. Soc. Chim., France*, No. 23 (1962) pp. 23-26 no month.

Linsky et al.; *Inorganic Chemistry*, vol. 19, No. 10, 1980, "Studies of a Series of Haloaluminum, -gallium, and -indium Phthalocyanines"; pp. 3131-3135 no month.

*Primary Examiner*—Mark L. Bell
*Assistant Examiner*—Scott L. Hertzog
*Attorney, Agent, or Firm*—Oliff & Berridge

[57] ABSTRACT

A process for preparing a hydroxymetal phthalocyanine pigment containing a central metal atom selected from aluminum, gallium, indium, silicon, germanium and tin and having a novel crystal form is disclosed, comprising treating a precursor of a hydroxymetal phthalocyanine pigment with an acid and treating the precipitated hydroxymetal phthalocyanine pigment with a solvent under an acidic condition. The resulting hydroxymetal phthalocyanine pigment includes hydroxygallium crystals showing distinct diffraction peaks at Bragg angles ($2\theta \pm 0.2°$) of (1) 8.2°, 12.4°, 16.5° and 26.3° or (2) 6.8°, 12.5° and 26.4°. The resulting hydroxymetal phthalocyanine pigment exhibits high photosensitivity and excellent stability as a charge generating material of an electrophotographic photoreceptor.

8 Claims, 6 Drawing Sheets

BRAGG ANGLE (2θ)

PROCESS FOR PREPARING HYDROXYMETAL PHTHALOCYANINE PIGMENT

FIELD OF THE INVENTION

This invention relates to a process for preparing a hydroxymetal phthalocyanine pigment, and more particularly to hydroxygallium phthalocyanine having a novel crystal form and a process for preparing the same.

BACKGROUND OF THE INVENTION

Phthalocyanine compounds are useful as coatings, printing inks, catalysts or electronic materials and have recently been given extensive study particularly for their use as electrophotographic photosensitive material, optical recording materials and photoelectric conversion materials.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine include $\alpha$-, $\pi$-, $\chi$-, $\rho$-, $\gamma$-, and $\delta$-forms as well as a stable $\beta$-form. These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 (the term "JP-A" as used herein means an "unexamined published Japanese patent application") has a mention of the relationship between a crystal form of copper phthalocyanine and its electrophotographic sensitivity.

Besides copper phthalocyanine, it has been proposed to use various crystal forms of metal-free phthalocyanine, hydroxygallium phthalocyanine, chloroaluminum phthalocyanine, chloroindium phthalocyanine, etc. in electrophotographic photoreceptors (see JP-A-1-221459, JP-A-59-168461, and JP-A59-180566).

There are a number of reports on preparation or treatment of phthalocyanine compounds. With reference to hydroxygallium phthalocyanine, for example, a process consisting of acid pasting of chlorogallium phthalocyanine with sulfuric acid and washing with water and then with aqueous ammonia is disclosed in *Bull. Soc. Chim., France*, No. 23 (1962), and a process consisting of hydrolyzing chlorogallium phthalocyanine using ammonium hydroxide and pyridine is reported in *Inorg. Chem.*, Vol. 19, p. 3131 (1980).

However, any of the phthalocyanine compounds prepared by the conventional processes is still unsatisfactory in photosensitivity, stability, etc. when used as a charge generating material in an electrophotographic photoreceptor. It has thus been demanded to develop a phthalocyanine compound having improved performance properties.

SUMMARY OF THE INVENTION

An object of the present invention is to provide a process for preparing a hydroxymetal phthalocyanine pigment having a novel crystal form which exhibits high photosensitivity and excellent stability when used in an electrophotographic photoreceptor.

Another object of the present invention is to provide a process for preparing a hydroxygallium phthalocyanine pigment having a novel crystal form.

A further object of the present invention is to provide a novel crystal of hydroxygallium phthalocyanine having distinct diffraction peaks at Bragg angles ($2\theta \pm 0.2°$) of (1) 8.2°, 12.4°, 16.5° and 26.3° or (2) 6.8°, 12.5° and 26.4°.

As a result of extensive investigations, the inventors have found that the above objects of the present invention are accomplished by treating a hydroxymetal phthalocyanine pigment precursor with an acid and treating the resulting hydroxymetal phthalocyanine crystal with a solvent as it is, i.e., without conducting neutralization. The present invention has been completed based on this finding.

The present invention relates to a process for preparing a hydroxymetal phthalocyanine pigment comprising treating a precursor of a hydroxymetal phthalocyanine pigment with an acid to precipitate a hydroxymetal phthalocyanine pigment and treating the precipitated hydroxymetal phthalocyanine pigment with a solvent under an acidic condition.

The present invention also relates to a novel hydroxygallium phthalocyanine crystal showing distinct diffraction peaks at Bragg angles ($2\theta \pm 0.2°$) of (1) 8.2°, 12.4°, 16.5° and 26.3° or (2) 6.8°, 12.5° and 26.4°.

DETAILED DESCRIPTION OF THE INVENTION

In the present invention, the X-ray diffraction pattern is the measurement results of intensities of the Bragg angle ($2\theta$) with respect to CuK$_\alpha$ characteristic X-ray (wavelength: 1.541 Å). The measurement conditions are as follows:

Apparatus: X-ray diffractometer (RAD-RC produced by Rigaku K.K.)

Target: Cu (1.54050 Å)
Voltage: 40.0 KV
Start angle: 5.00 deg
Stop angle: 40.00 deg
Step angle: 0.020 deg The hydroxymetal phthalocyanine pigment according to the present invention is represented by formula (I) shown below and has a novel crystal form.

wherein M represents aluminum, gallium, indium, silicon, germanium or tin; X represents a chlorine atom, a bromine atom or an iodine atom; m represents 1 or 2; and a plurality of n's each represent 0 or an integer of from 1 to 4.

More specifically, the hydroxymetal phthalocyanine pigment of formula (I) includes hydroxyaluminum phthalocyanine, hydroxygallium phthalocyanine, hydroxyindium phthalocyanine, hydroxysilicon phthalocyanine, hydroxygermanium phthalocyanine, hydroxtin phthalocyanine, and halogen-substituted compounds thereof.

Preferred of these hydroxymetal phthalocyanine pigments are (1) a hydroxygallium phthalocyanine crystal having distinct diffraction peaks at Bragg angles ($2\theta\pm0.2°$) of (1) 8.2°, 12.4°, 16.5° and 26.3° and (2) a hydroxygallium phthalocyanine crystal having distinct diffraction peaks at Bragg angles ($2\theta\pm0.2°$) of 6.8°, 12.5° and 26.4°.

The hydroxymetal phthalocyanine pigment precursor which can be used as a starting material in the present invention, which is a metal phthalocyanine pigment having aluminum, gallium, indium, silicon, germanium or tin as a central metal atom, is not limited by a process of production and may be prepared by any of known processes. A hydroxygallium phthalocyanine pigment precursor, for example, includes halogenated gallium phthalocyanine compounds obtained by (1) a process comprising reacting gallium trichloride and diiminoisoindoline as described in D.C.R. Acad. Sci., Vol. 242, p. 1026 (1956), (2) a process comprising reacting gallium trichloride with phthalonitrile as disclosed in JP-B-3-30854 (the term "JP-B" as used herein means an "examined published Japanese patent application"), (3) a process comprising reacting gallium trichloride with phthalonitrile in butyl cellosolve in the presence of a catalyst as taught in JP-A-1-221459, (4) a process comprising reacting gallium trichloride with phthalonitrile in quinoline as disclosed in Inorg. Chem., Vol. 19, p. 3131 (1980), (5) a process comprising reacting gallium tribromide with phthalonitrile as described in JP-A-59-133551, and (6) a process comprising reacting gallium triiodide with phthalonitrile as reported in JP-A-60-59354.

Known processes for synthesizing other hydroxymetal phthalocyanine pigment precursors include (7) a reaction between silicon tetrachloride and diiminoisoindoline in quinoline (Inorg. Chem., Vol. 4, p. 128 (1965)), (8) a reaction between germanium tetrachloride and phthalonitrile in quinoline (J. Amer. Chem. Soc., Vol. 82, p. 5790 (1960)), (9) a reaction between stannous chloride and phthalonitrile in 1-chloronaphthalene (Inorg. Chem., Vol. 3, p. 251 (1964)), (10) a reaction between aluminum trichloride and phthalonitrile in quinoline (AD 608262, AvailCFSTI, p. 69 (1964)), and (11) a reaction between indium trichloride and phthalonitrile (JP-A-59-155851).

A hydroxymetal phthalocyanine pigment precursor is first treated with an acid to precipitate the corresponding hydroxymetal phthalocyanine crystal represented by formula (I). Acids to be used include those having high solubility, such as trichloroacetic acid, phosphoric acid, methanesulfonic acid, hydrochloric acid, nitric acid, and sulfuric acid. Among them, sulfuric acid is preferred for its high solubility, no fuming properties and ease of handling. The acid treatment is carried out by adding the pigment precursor to an acid, dissolving the pigment precursor at a temperature of from 0° to 100° C., and preferably from 5° to 80° C., and pouring the acid solution into a solvent to reprecipitate a hydroxymetal phthalocyanine pigment. The acid is used in an amount usually of from 2 to 70 parts by weight, and preferably of from 10 to 50 parts by weight, per part by weight of the hydroxymethyl phthalocyanine pigment precursor.

The solvent to be used for reprecipitation includes water and a mixed solvent of water and an organic solvent. The solvent is used in an amount of from 2 to 20 parts by weight, and preferably from 5 to 15 parts by weight, per part by weight of the acid used. In order to avoid vigorous heat generation, the solvent for precipitation is preferably kept at 10° C. or lower. For the purpose of accelerating hydrolysis, it is effective to heat the suspension after the acid treatment.

The resulting hydroxymetal phthalocyanine pigment is then treated with a solvent either as precipitated or after being washed with water and as containing a residual acid. The washing with water may be followed by drying. Prior to the solvent treatment the precipitated hydroxymetal phthalocyanine pigment may be once dried and dry ground in the absence of a solvent.

The solvent treatment can be carried out by stirring in a solvent or wet grinding by means of a ball mill, a mortar, a sand mill, a kneader, etc.

Solvents which can be used in the solvent treatment include amides, e.g., N,N-dimethylformamide and N-methylpyrrolidone; esters, e.g., ethyl acetate and butyl acetate; ketones, e.g., acetone and methyl ethyl ketone; monohydric alcohols, e.g., methanol and ethanol; polyhydric alcohols, e.g., ethylene glycol; ethers, e.g., diethyl ether and tetrahydrofuran; pyridine; quinoline; halogenated aromatic hydrocarbons, e.g., bromobenzene and chloronaphthalene; halogenated hydrocarbons, e.g., methylene chloride and carbon tetrachloride; and aromatic alcohols, e.g., benzyl alcohol. These organic solvents may be used in combination of two or more thereof or in combination with water. Of them, N,N-dimethylformamide, methanol, 1-chloronaphthalene, n-butyl acetate, ethylene glycol, benzyl alcohol, quinoline, methylene chloride or tetrahydrofurane is preferable. Preferred examples of solvents to obtain the hydroxygallium phthalocyanine crystal having distinct diffraction peaks at Bragg angles ($2\theta \pm 0.2°$) of 8.2°, 12.4°, 16.5° C., and 26.3° include amides and monohydric alcohols. Preferred examples of solvents to obtain the hydroxygallium phthalocyanine crystal having distinct diffraction peaks at Bragg angles ($2\theta \pm 0.2°$) of 6.8°, 12.5° and 26.4° include halogenated hydrocarbons, ethers, aromatic alcohols and polyhydric alcohols. The amount of the solvent to be used ranges from 1 to 200 parts by weight, and preferably from 10 to 100 parts by weight, per part by weight of the hydroxymetal phthalocyanine pigment. The treating temperature is in the range of from 0° to 150° C., and preferably from room temperature to 100° C. The wet grinding may be effected with 0.5 to 20 parts by weight, and preferably 1 to 10 parts by weight, of a grinding aid, such as sodium chloride or salt cake per part by weight of the pigment. After the solvent treatment, it is desirable to neutralize the residual acid with a base for obtaining improved electrical characteristics.

The inventors have found that hydroxymetal phthalocyanine pigments are largely different from general phthalocyanine pigments in terms of the condition after acid pasting. That is, general phthalocyanine pigments after being subjected to acid pasting assume a bright blue color in the acid solution, whereas hydroxymetal phthalocyanine pigments assume a dark green color in the acid solution after acid pasting and turn to bright blue on being rendered weakly basic. This indicates that the hydroxyl group possessed by hydroxymetal phthalocyanine pigments is much more liable to protonation than the general phthalocyanine pigments. It appears that the protonated acid cannot be sufficiently removed simply by washing with water and that the pigment is not converted to a free hydroxymetal phthalocyanine pigment until the residual acid is neutralized with a base.

Accordingly, the conventional techniques for preparing hydroxymetal phthalocyanine pigments involve a neutralization treatment for acid removal after acid pasting prior to a solvent treatment. To the contrary, the present invention is characterized in that such a neutralization treatment is not conducted after acid pasting, and the hydroxymetal phthalocyanine pigment assuming a dark green color, which seems to contain a trace amount of an acid, is directly subjected to a solvent treatment. There is thus obtained a hydroxymetal phthalocyanine crystal having a novel crystal form. The resulting novel hydroxymetal phthalocyanine crystal, when used as a charge generating material, provides an electrophotographic photoreceptor with high photosensitivity and excellent stability.

The present invention will now be illustrated in greater detail with reference to Synthesis Example, Examples, and Application Examples, but it should be understood that the present invention is not construed as being limited thereto. All the parts are by weight unless otherwise indicated.

SYNTHESIS EXAMPLE 1

In 230 parts of quinoline were put 30 parts of 1,3-diiminoisoindoline and 9.1 parts of gallium trichloride, and the mixture was allowed to react at 200° C. for 3 hours. The reaction product was collected by filtration, washed with acetone and methanol, and dried to obtain 28 parts of chlorogallium phthalocyanine crystals.

EXAMPLE 1

Figure 1:
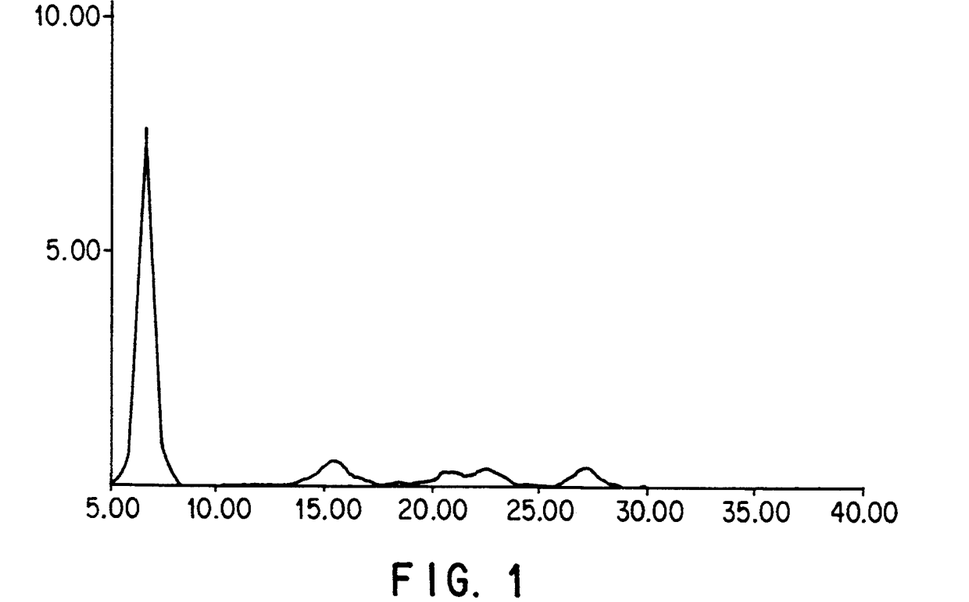
FIG. 1 and FIG. 11 are a powder X-ray diffraction pattern of the hydroxygallium phthalocyanine crystals obtained by the acid treatment in Example 1 under different conditions.
Figure 11:
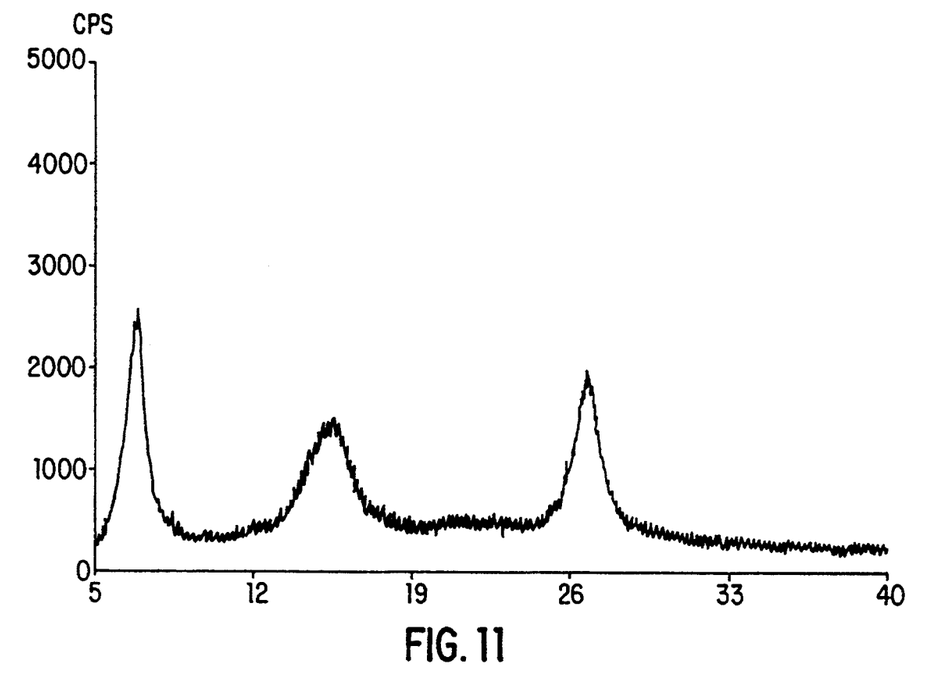

Six parts of the chlorogallium phthalocyanine crystals obtained in Synthesis Example 1 were dissolved in 180 parts of concentrated sulfuric acid at 0° C. and the solution was added dropwise to 900 parts of distilled water kept at 5° C. to reprecipitate crystals. The precipitated hydroxygallium phthalocyanine crystals collected by centrifugal separation were thoroughly dispersed in about 900 ml of distilled water, followed by centrifugation. The centrifugal washing with water was repeated three times in total, and the final solid was dried to obtain 5.2 parts of green hydroxygallium phthalocyanine crystals. A powder X-ray diffraction pattern of the crystals is shown in FIG. 1 and FIG. 11. A powder X-ray diffraction pattern of FIG. 1 was subjected to smoothing operation to eliminate noise. The measurement conditions in FIG. 11 were as follows:
Voltage/Current: 40 KV/30 mA
Scan speed: 2.000 deg
Sample width: 0.01 deg
Smoothing: 0
Wavelength: 1.5406 Å

Figure 2:
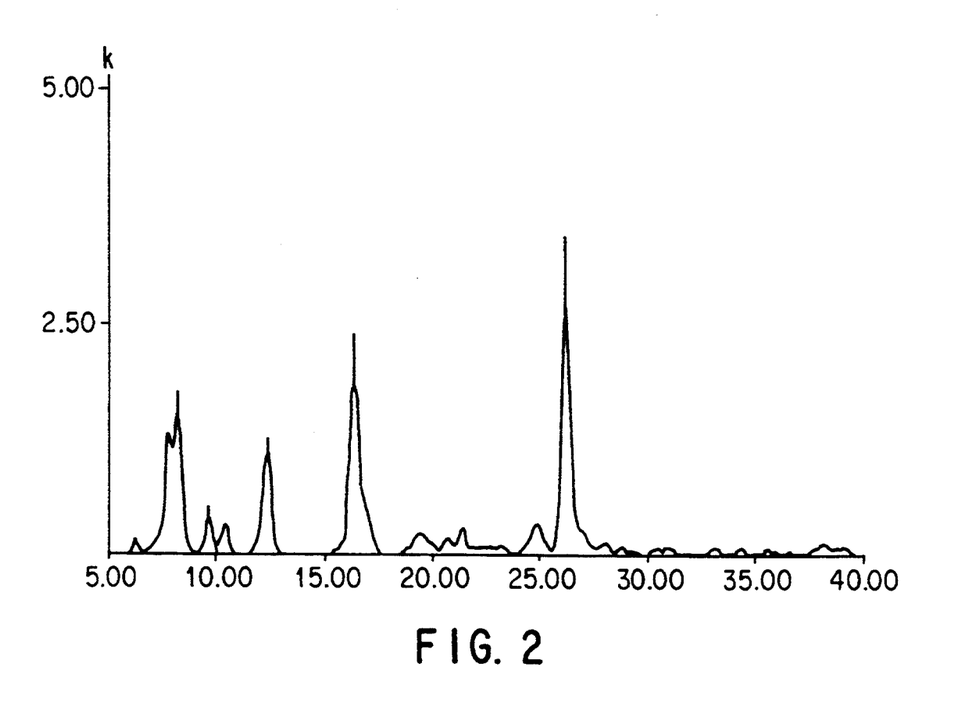
FIG. 2 is a powder X-ray diffraction pattern of the hydroxygallium phthalocyanine crystals obtained by the solvent treatment in Example 1 or 2.

Zero-point-five part of the resulting hydroxygallium phthalocyanine crystals was milled with 15 parts of N,N-dimethylformamide and 30 parts of glass beads having a diameter of 1 mm for 24 hours. The crystals were separated, washed with methanol and dried to obtain 0.45 part of novel hydroxygallium phthalocyanine crystals. A powder X-ray diffraction pattern of the resulting crystals is shown in FIG. 2.

EXAMPLES 2 TO 9

Zero-point-three part of the green hydroxygallium phthalocyanine obtained by the acid pasting in Example 1 and having the X-ray diffraction pattern of FIG. 1 was treated with the solvent shown in Table 1 below in the same manner as in Example 1. A powder X-ray diffraction pattern of the resulting crystals is also shown in the Table.

TABLE 1

Figure 3:
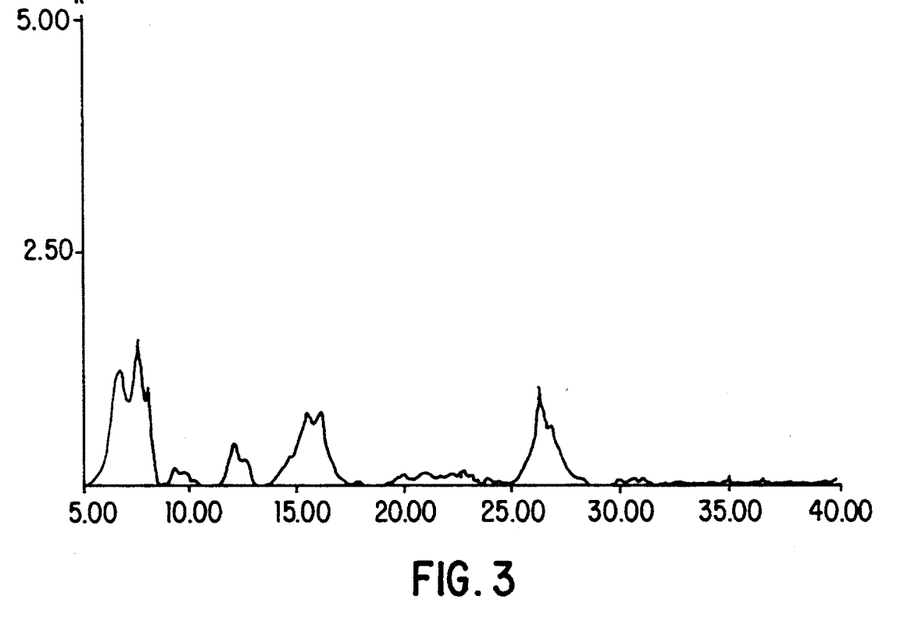
FIG. 3 is a powder X-ray diffraction pattern of the hydroxygallium phthalocyanine crystal obtained by the solvent treatment in Example 3.
Figure 4:
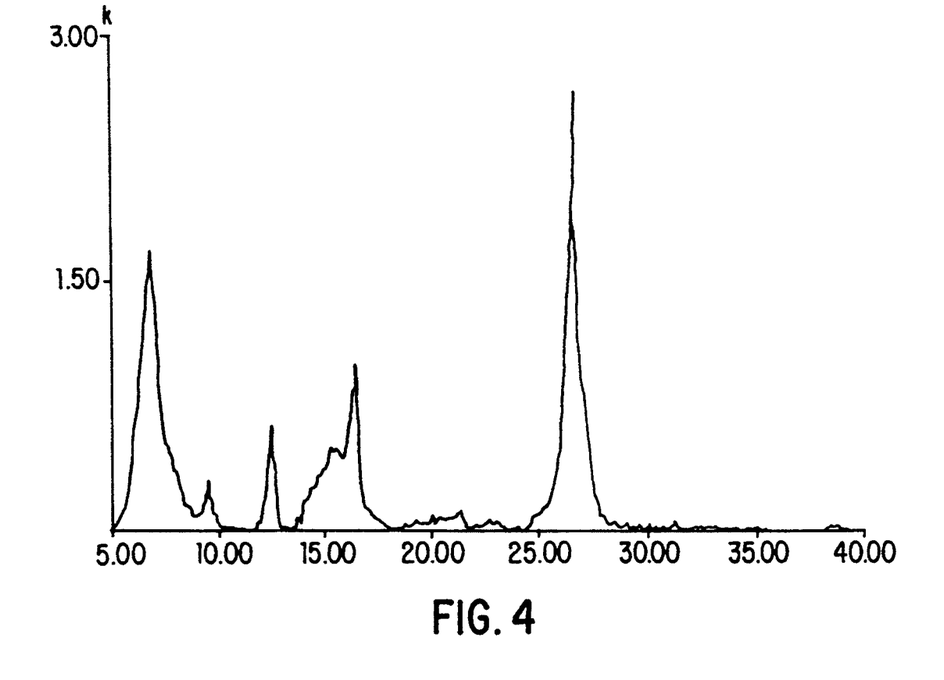
FIG. 4 is a powder X-ray diffraction pattern of the hydroxygallium phthalocyanine crystals obtained by the solvent treatment in Example 4, 5, 6, 8 or 9.
Figure 5:
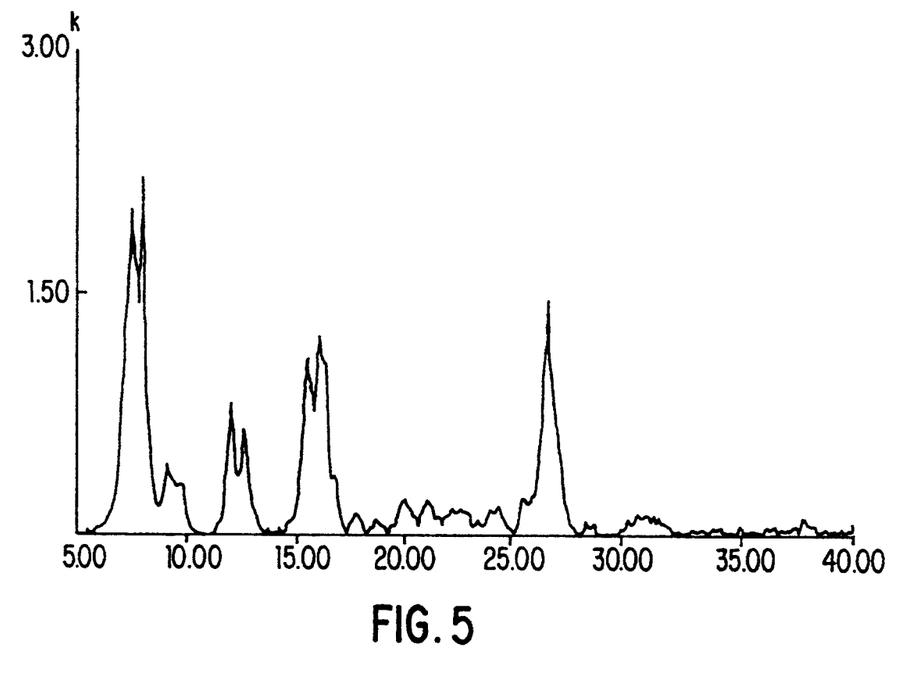
FIG. 5 is a powder X-ray diffraction pattern of the hydroxygallium phthalocyanine crystals obtained by the solvent treatment in Example 7.

| Example No. | Solvent | X-Ray Diffraction Pattern |
|---|---|---|
| 2 | methanol | FIG. 2 |
| 3 | 1-chloronaphthalene | FIG. 3 |
| 4 | n-butyl acetate | FIG. 4 |
| 5 | ethylene glycol | FIG. 4 |
| 6 | benzyl alcohol | FIG. 4 |
| 7 | quinoline | FIG. 5 |
| 8 | methylene chloride | FIG. 4 |
| 9 | tetrahydrofuran | FIG. 4 |

COMPARATIVE EXAMPLE 1

Figure 6:
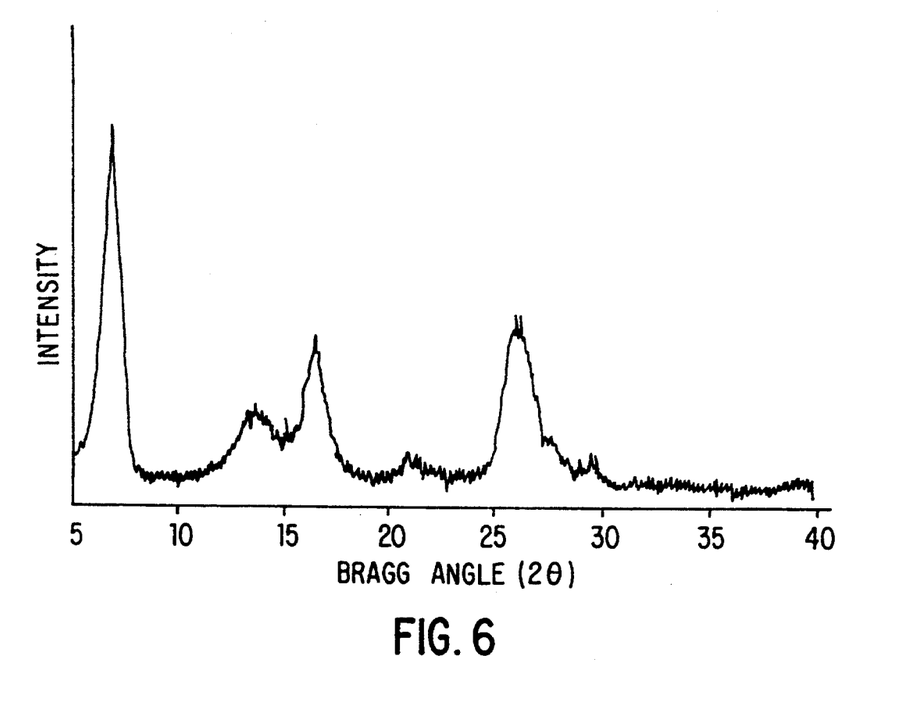
FIG. 6 and FIG. 12 are a powder X-ray diffraction pattern of the hydroxygallium phthalocyanine crystals obtained by the neutralization treatment in Comparative Example 1 under different conditions.
Figure 12:
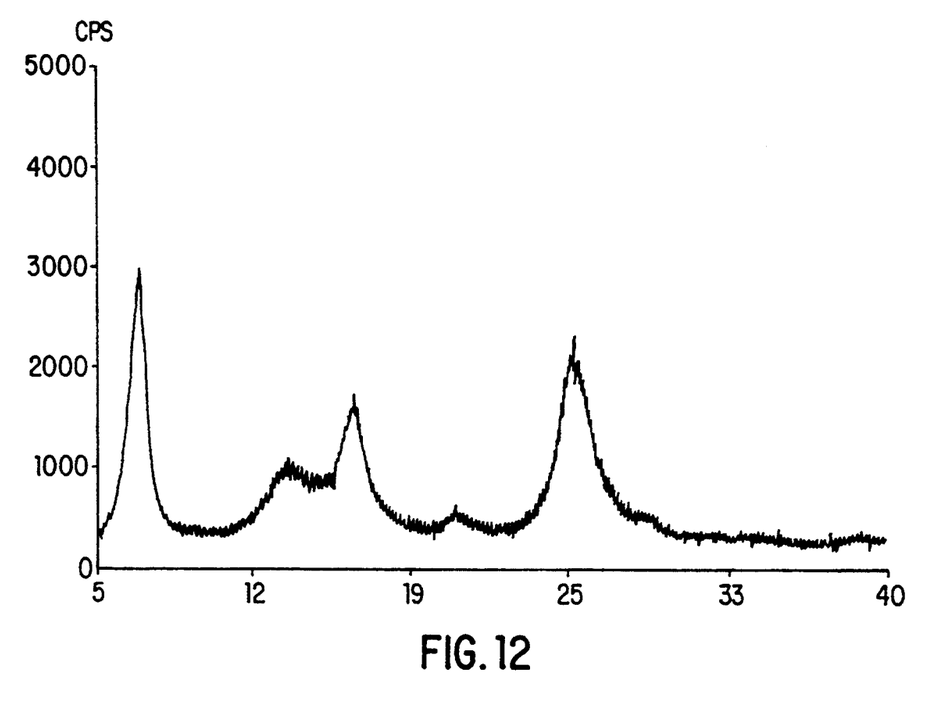

Three parts of the green hydroxygallium phthalocyanine crystals obtained by acid pasting in Example 1 and having the X-ray diffraction pattern of FIG. 1 were suspended in 200 ml of 2% aqueous ammonia, followed by thoroughly stirring at room temperature. The crystals changed from dark green to dark blue on addition of the aqueous ammonia. The crystals were sufficiently washed with distilled water and dried to obtain 2.7 parts of hydroxygallium phthalocyanine crystals. A powder X-ray diffraction pattern of the resulting crystals is shown in FIG. 6 and FIG. 12. A powder X-ray diffraction pattern of FIG. 6 was subjected to smoothing operation to eliminate noise. The measurement conditions in FIG. 12 are the same as those in FIG. 11.

Figure 7:
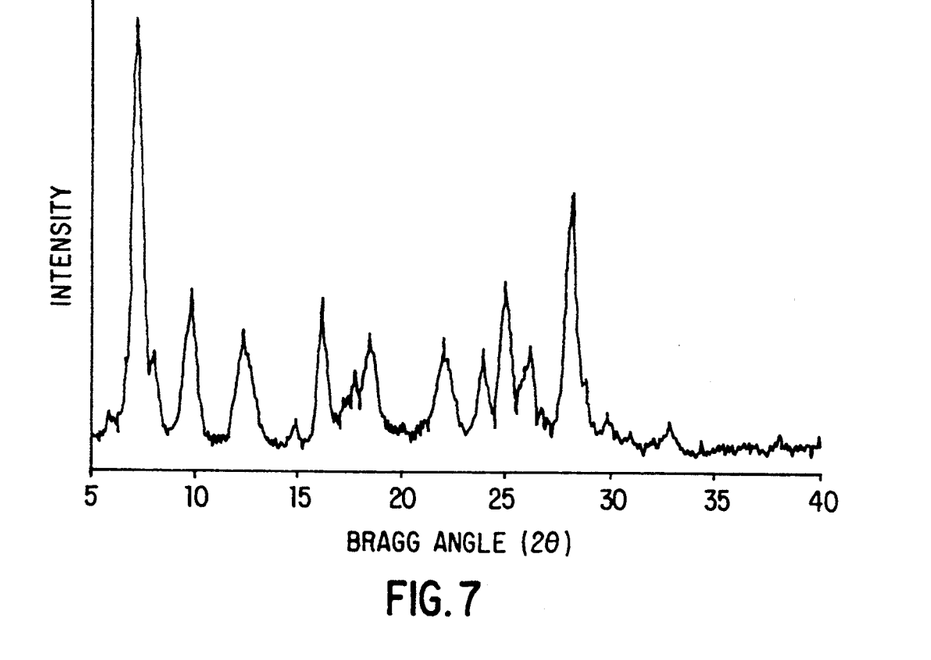
FIG. 7 is a powder X-ray diffraction pattern of the hydroxygallium phthalocyanine crystals obtained in the solvent treatment in Comparative Example 1.

Zero-point-five part;of the crystals was milled with 15 parts of N,N-dimethylformamide and 30 parts of glass beads having a diameter of 1 mm for 24 hours. The crystals were separated, washed with methanol and dried to obtain 0.45 part of hydroxygallium phthalocyanine crystals. A powder X-ray diffraction pattern of the resulting crystals is shown in FIG. 7.

COMPARATIVE EXAMPLES 2 TO 4

Zero-point-three part of the blue hydroxygallium phthalocyanine obtained in Comparative Example 1 and having the powder X-ray diffraction pattern of FIG. 6 was treated with the solvent shown in Table 2 below in the same manner as in Comparative Example 1. A powder X-ray diffraction pattern of the resulting crystals is also shown in the Table.

TABLE 2

Figure 8:
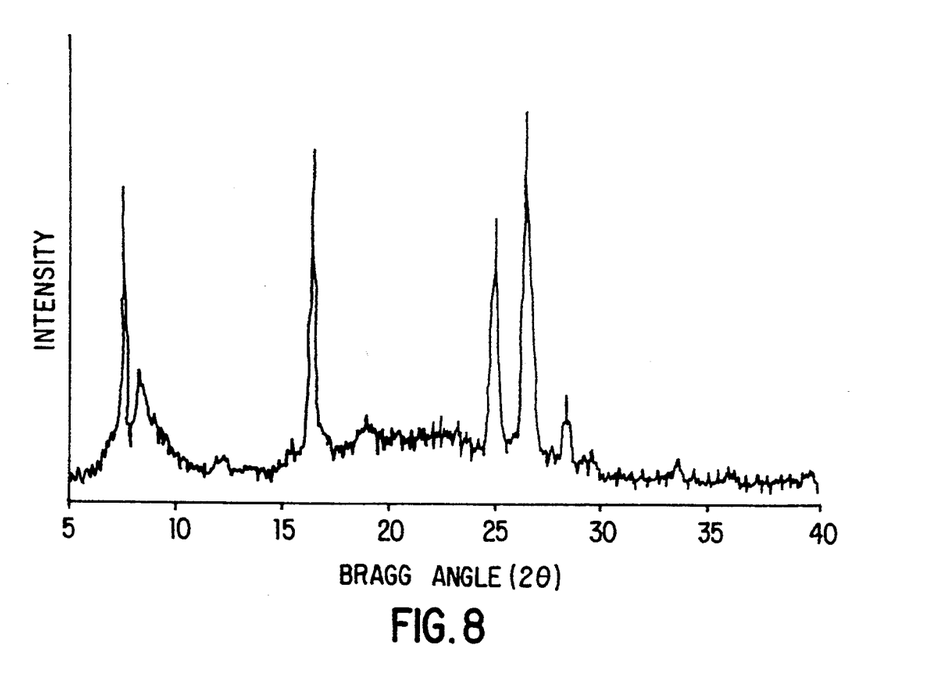
FIG. 8 is a powder X-ray diffraction pattern of the hydroxygallium phthalocyanine crystals obtained in the solvent treatment in Comparative Example 2.
Figure 9:
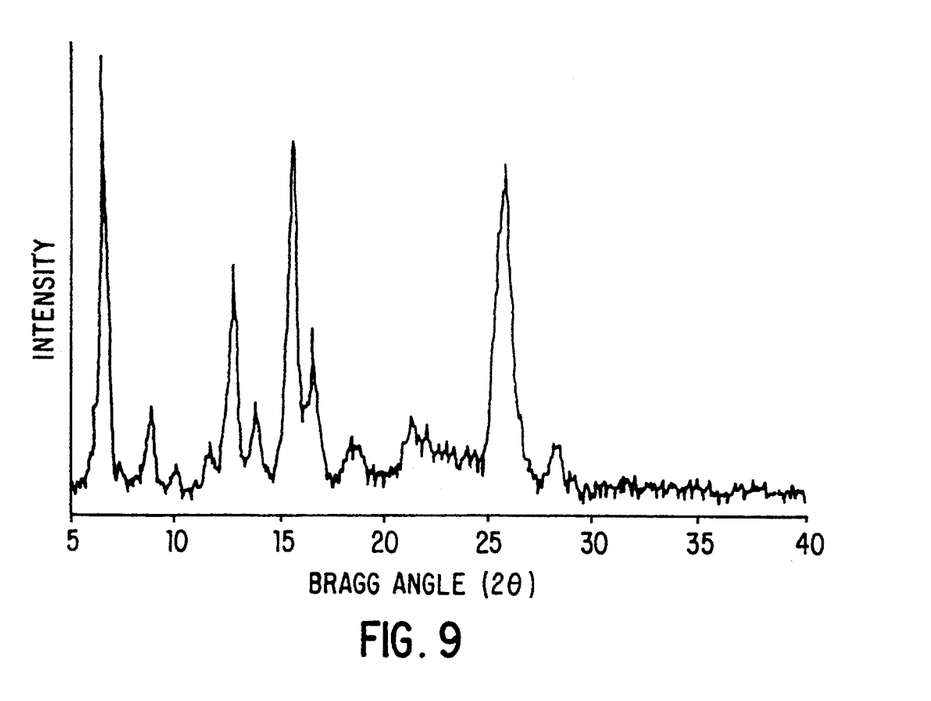
FIG. 9 is a powder X-ray diffraction pattern of the hydroxygallium phthalocyanine crystals obtained in the solvent treatment in Comparative Example 3.
Figure 10:
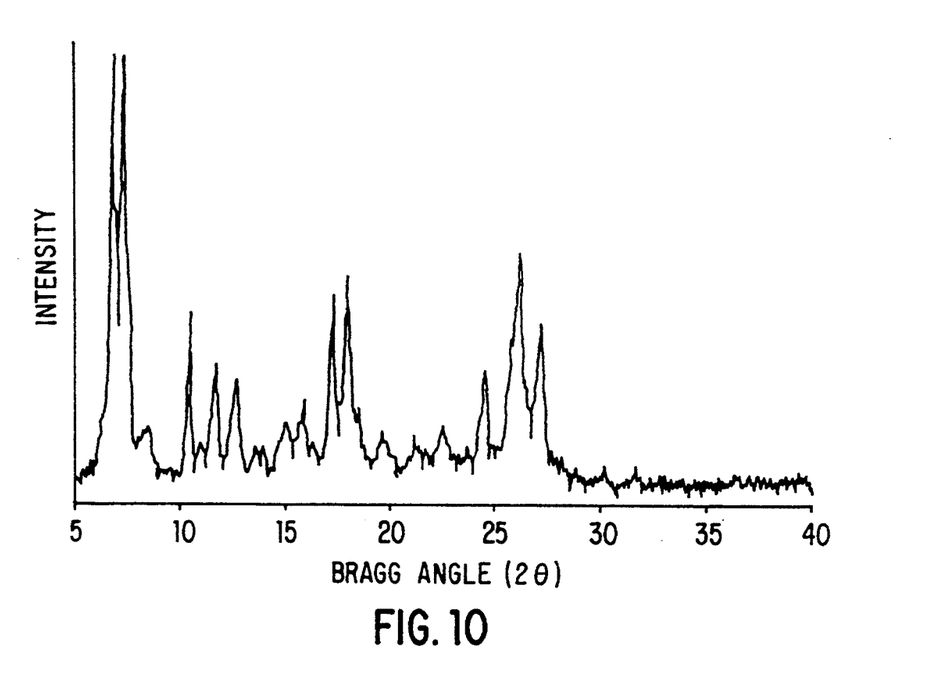
FIG. 10 is a powder X-ray diffraction pattern of the hydroxygallium phthalocyanine crystals obtained in the solvent treatment in Comparative Example 4.

| Comparative Example No. | Solvent | X-Ray Diffraction Pattern |
|---|---|---|
| 2 | methanol | FIG. 8 |
| 3 | ethylene glycol | FIG. 9 |
| 4 | benzyl alcohol | FIG. 10 |

APPLICATION EXAMPLE 1

A solution consisting of 10 parts of a zirconium compound "Orgatics ZC 540" (produced by Matsumoto Seiyaku K.K.), 1 part of a silane compound "A 1110" (produced by Nippon Unicar Co., Ltd.), 40 parts of isopropyl alcohol, and 20 parts of butanol was coated on an aluminum substrate by dip coating and dried by;heating at 150° C. for 10 minutes to form a subbing layer having a thickness of 0.5 μm.

Zero-point-one part of the hydroxygallium phthalocyanine crystals obtained in Example 1 and having the powder X-ray diffraction pattern of FIG. 2 was mixed with 0.1 part of a polyvinyl butyral resin "S-Lec BM-S" (produced by Sekisui Chemical Co., Ltd.) and 10 parts of n-butyl acetate, and the mixture was dispersed in a paint shaker together with glass beads for 1 hour. The resulting coating composition was coated on the subbing layer with a wire bar No. 5, and dried by heating at 100° C. for 10 minutes to form a charge generating layer having a thickness of about 0.15 μm. X-Ray diffractometry of the hydroxygallium phthalocyanine crystals in the dispersion revealed that the crystal form had not changed on being dispersed.

In 20 parts of monochlorobenzene were dissolved 2 parts of a compound represented by formula (1):

and 3 parts of a polycarbonate resin represented by formula (2):

and the resulting coating composition was coated on the charge generating layer by dip coating and dried by heating at 120° C. for 1 hour to form a charge transporting layer having a thickness of 20 μm.

Electrophotographic characteristics of the thus prepared electrophotographic photoreceptor were evaluated as follows.

The photoreceptor was charged by a corona discharge of $-2.5$ μA using a flat plate scanner to an initial surface potential $V_0$ (V) under a normal temperature and normal humidity condition (20° C., 40% RH). A dark decay potential after 1 second $V_{DDP}(V)$ was measured to obtain a dark decay rate DDR (%) (i.e., $100(V_0 - V_{DDP})/V_0$). Then, the photoreceptor was exposed to monochromatic light of 780 nm, which was isolated from light emitted from a tungsten lamp by means of a monochromator and adjusted to 0.25 μW/cm$^2$ on the surface of the photoreceptor, and the initial sensitivity dV/dE (V.cm$^2$/erg) was measured. The results of these measurements are shown in Table 3 below.

APPLICATION EXAMPLES 2 TO 5

An electrophotographic photoreceptor was prepared in the same manner as in Application Example 1, except for using the pigment shown in Table 3 in place of the hydroxygallium phthalocyanine obtained in Example 1. The resulting photoreceptor was evaluated in the same manner as in Application Example 1. The results obtained are shown in Table 3.

TABLE 3

| Appln. Example No. | HOGaPc* Used | $V_O$ (V) | $V_{DDP}$ (V) | DDR (%) | dV/dE (V · cm$^2$/ erg) |
|---|---|---|---|---|---|
| 1 | FIG. 2 | −603 | −579 | 4.0 | 209 |
| 2 | FIG. 3 | −535 | −495 | 7.5 | 80 |
| 3 | FIG. 4 | −608 | −562 | 7.9 | 89 |
| 4 | FIG. 5 | −776 | −717 | 7.5 | 143 |
| 5 | x-H$_2$Pc** | −580 | −552 | 4.8 | 53 |

Note:
*Hydroxygallium phthalocyanine
**x-Type metal-free phthalocyanine

According to the present invention, a hydroxymetal phthalocyanine pigment having a novel crystal form can be obtained. The hydroxymetal phthalocyanine pigment obtained by the process of the present invention exhibits high photosensitivity and excellent stability when used as an electrophotographic photoreceptor.

While the invention has been described in detail and with reference to specific examples thereof, it will be apparent to one skilled in the art that various changes and modifications can be made therein without departing from the spirit and scope thereof.

What is claimed is:

1. A process for preparing a hydroxymetal phthalocyanine pigment comprising treating a precursor of a hydroxymetal phthalocyanine pigment with an acid to precipitate a hydroxymetal phthalocyanine pigment and treating the precipitated hydroxymetal phthalocyanine pigment with a solvent under an acidic condition.

2. A process as claimed in claim 1, wherein said precursor of a hydroxymetal phthalocyanine pigment is a precursor of a hydroxygallium phthalocyanine pigment.

3. A process as claimed in claim 1, wherein said acid is sulfuric acid.

4. A process as claimed in claim 2, wherein said solvent is an amide solvent or a monohydric alcohol solvent and the resulting hydroxymetal phthalocyanine pigment is a hydroxygallium phthalocyanine crystal having distinct diffraction peaks at Bragg angles $(2\theta \pm 0.2°)$ of 8.2°, 12.4°, 16.5°, and 26.3°.

5. A process as claimed in claim 2, wherein said solvent is a halogenated hydrocarbon solvent, an ether solvent, an aromatic alcohol solvent or a polyhydric alcohol solvent and the resulting hydroxymetal phthalocyanine pigment is a hydroxygallium phthalocyanine crystal having distinct diffraction peaks at Bragg angles $(2\theta \pm 0.2°)$ of 6.8°, 12.5° and 26.4°.

6. A process as claimed in claim 1, wherein said precursor of a hydroxymetal phthalocyanine pigment is a precursor of a hydroxyaluminum phthalocyanine pigment, a hydroxyindium phthalocyanine pigment, a hydroxysilicon phthalocyanine pigment, a hydroxygermanium phthalocyanine pigment or a hydroxytin phthalocyanine pigment.

7. A hydroxygallium phthalocyanine crystal having distinct diffraction peaks at Bragg angles $(2\theta \pm 0.2°)$ of 8.2°, 12.4°, 16.5°, and 26.3°.

8. A hydroxygallium phthalocyanine crystal having distinct diffraction peaks at Bragg angles $(2\theta \pm 0.2°)$ of 6.8°, 12.5° and 26.4°.

* * * * *